(12) United States Patent
Clarke

(10) Patent No.: US 7,171,375 B2
(45) Date of Patent: Jan. 30, 2007

(54) METHOD AND SYSTEM FOR ENTERPRISE WIDE PRODUCTION SCHEDULING

(75) Inventor: Hernan Jose Clarke, Scottsdale, AZ (US)

(73) Assignee: 4Sight Technologies, Inc., Scottsdale, AZ (US)

( * ) Notice: Subject to any disclaimer, the term of this patent is extended or adjusted under 35 U.S.C. 154(b) by 726 days.

(21) Appl. No.: 09/837,807

(22) Filed: Apr. 17, 2001

(65) Prior Publication Data

US 2002/0007297 A1    Jan. 17, 2002

(51) Int. Cl.
*G06Q 10/00* (2006.01)

(52) U.S. Cl. ............................................. 705/8; 705/9

(58) Field of Classification Search .................... 705/8, 705/9

See application file for complete search history.

(56) References Cited

U.S. PATENT DOCUMENTS

| | | | | |
|---|---|---|---|---|
| 5,093,794 A | * | 3/1992 | Howie et al. | 700/100 |
| 5,099,431 A | * | 3/1992 | Natarajan | 700/105 |
| 5,101,352 A | * | 3/1992 | Rembert | 705/8 |
| 5,432,887 A | * | 7/1995 | Khaw | 706/19 |
| 5,737,227 A | * | 4/1998 | Greenfield et al. | 705/400 |
| H1743 H | * | 8/1998 | Graves et al. | 700/236 |
| 5,881,283 A | * | 3/1999 | Hondou et al. | 718/100 |
| 6,119,102 A | * | 9/2000 | Rush et al. | 705/29 |
| 6,141,647 A | * | 10/2000 | Meijer et al. | 705/1 |
| 6,216,109 B1 | * | 4/2001 | Zweben et al. | 705/8 |
| 6,345,259 B1 | * | 2/2002 | Sandoval | 705/7 |
| 6,370,521 B1 | * | 4/2002 | Pigos et al. | 707/2 |
| 6,397,118 B1 | * | 5/2002 | Gleditsch et al. | 700/99 |
| 6,415,259 B1 | * | 7/2002 | Wolfinger et al. | 705/8 |
| 6,539,399 B1 | * | 3/2003 | Hazama et al. | 707/104.1 |
| 2001/0056362 A1 | * | 12/2001 | Hanagan et al. | 705/7 |

FOREIGN PATENT DOCUMENTS

JP    10000539 A    *    1/1998

OTHER PUBLICATIONS

Vacca, John R., Feb. 1992, "Recapturing the Industrial Market. (software tools are available to enable US manufacturers to recapture markets worldwide)", Midrange Systems, v5, n3, p. 52(3).*

* cited by examiner

*Primary Examiner*—Michelle Tarae
*Assistant Examiner*—Jonathan G. Sterrett
(74) *Attorney, Agent, or Firm*—Robert D. Atkins; Quarles & Brady Streich Lang LLP

(57) ABSTRACT

A computer implemented method and system for enterprise wide planning is disclosed. In an embodiment, one or more work card templates are initially defined. Then a plurality of work cards representing a project are received and compared with the work card templates. Scheduling parameters from the work card templates are added to the matching work cards. Then, expected non-routine work cards are added to the work cards. Next, the expected non-routing work cards and the operational work cards are scheduled.

6 Claims, 14 Drawing Sheets

FIG. 6

Check Flow Generator | Check View | Report Designer | WC Template

Work Card Center:

Work Order: 1141 1141 B Check
Start Date/Time: 04/14/1999 09:00:00
Location: MEM Aircraft Type: MD11
Tail Number: N605FE
Model Number: 601

Operation Day: 366
Total Cards: 97
Open Cards: 91

Card Set:
○ All
◉ Open
○ Close

Open | Import | Update | NRs | MODs | Suspend | Milestone | Schedule | RT | Sequence | Sort

| Day | Hour | Shift | Status | Priority | Milestone | Type | Card | Zone | Skill | Manhours | Actuals | Description |
|---|---|---|---|---|---|---|---|---|---|---|---|---|
| 0 | 1 | Grave | Cleared | 4 | A02 | MP | 05-00 | 00 | 500 | 0.25 | 0 | A/C Staging |
| 1 | 8 | Day | Open | 1 | F03 | MP | 05-00 | 00 | 500 | 10.50 | 0 | A/C Staging |
| 2 | 18 | Swing | Open | 2 | E03 | MP | 05B00 | 00 | 200 | 5.00 | 0 | Aircraft Int |
| 3 | 7 | Swing | Open | 3 | E03 | MP | 05B00 | 00 | 500 | 4.50 | 0 | Wing Tip |
| 4 | 12 | Gave | Open | 4 | C01 | MP | 05B00 | 00 | 500 | 1.00 | 0 | Pre-Dock |
| 5 | 12 | Day | Open | 1 | D02 | MP | 05B00 | 00 | 500 | 2.00 | 0 | General Vis |
| 6 | 13 | Day | Open | 2 | D02 | MP | 05B00 | 00 | 500 | 1.00 | 0 | Hydraulic |
| 7 | 12 | Day | Open | 3 | G01 | MP | 05B00 | 10 | 500 | 2.00 | 0 | Post-Dock |
| 8 | 12 | Day | Open | 4 | D02 | MP | 05B00 | 10 | 500 | 1.00 | 0 | FWD & A |
| 9 | 12 | Day | Open | 1 | D02 | MP | 05B00 | 10 | 500 | 4.25 | 0 | Lower Cargo |
| 10 | 12 | Day | Open | 2 | D02 | MP | 05B00 | 10 | 500 | 0.75 | 0 | Bulk Cargo |

Day
∇|

⊖ and ⊖ or

Card

Total Entries

Work Cards:
☐ 05-0001
☐ 05-0003
☐ 05B0001
☐ 05B0002
☐ 05B0100
☐ 05B0200

FIG. 7

METHOD AND SYSTEM FOR ENTERPRISE WIDE PRODUCTION SCHEDULING

FIELD OF INVENTION

This invention relates to the field of multitier software and more specifically to a method and system for enterprise wide production scheduling.

BACKGROUND OF INVENTION

Converting maintenance and engineering tasks in a long-range schedule into work packages with the large number of work cards, resource requirements, and constraints driving the production of the work is one of the most complex and challenging duties faced by expert planners and schedulers.

Historically, producing realistic schedules and estimating project completion dates has been difficult. Much of this difficulty is due to the inability of planners and schedulers to accurately project the amount and extensiveness of repairs that routine inspection work will generate. For example, in some large maintenance industries, there is a series of inspections that is performed on the unit being serviced at the beginning of every maintenance event. It is from these inspections that planners and schedulers determine the actual amount of work required to complete the required maintenance project. However, modern planning systems fail to utilize this information in a meaningful way. What is needed is a planning system that takes into account historical knowledge.

SUMMARY OF THE INVENTION

In accordance with the teachings of the present inventions, method and system for enterprise wide production and scheduling is provided. The method and system of the present invention provides advantage over previously developed planning and scheduling techniques.

In one embodiment a computer implemented method and system for enterprise wide planning is disclosed. In an embodiment, one or more work card templates are initially defined. Then a plurality of work cards representing a project are received and compared with the work card templates. Scheduling parameters from the work card templates are added to the matching work cards. Then, expected non-routine work cards are added to the work cards. Next, the expected non-routing work cards and the operational work cards are scheduled.

A technical advantage of the present system is that expected non-routine work cards can be added. Additionally, what-if analysis and forecasting can be easily done. Additional technical advantages can be readily apparent from the following figures, description and claims.

BRIEF DESCRIPTION OF THE DRAWINGS

For a more complete understanding of the present invention and advantages thereof, reference is now made to the following descriptions, taken in conjunction with the following drawings, in which like reference numerals represent like parts, and in which:

FIG. 6 is a screen shot showing an exemplary work card center;

FIG. 7 is a production schedule screen shot;

DETAILED DESCRIPTION OF THE DRAWINGS

Turning first to the nomenclature of the specification, the detailed description which follows is represented largely in terms of processes and symbolic representations of operations by conventional computer components, including a central processing unit ("CPU") or processor associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process or method is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, text, terms, numbers, records, files, or the like. It should be kept in mind, however, that these and others should be associated with appropriate physical quantities for computer operations, and that these terms are merely conventional labels applied to physical quantities that exist within and during operation of the computer.

In addition, it should be understood that the programs, processes, methods, etc. described herein are but an example of one implementation of the present invention and are not related or limited to any particular computer, apparatus or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory.

Figure 1:
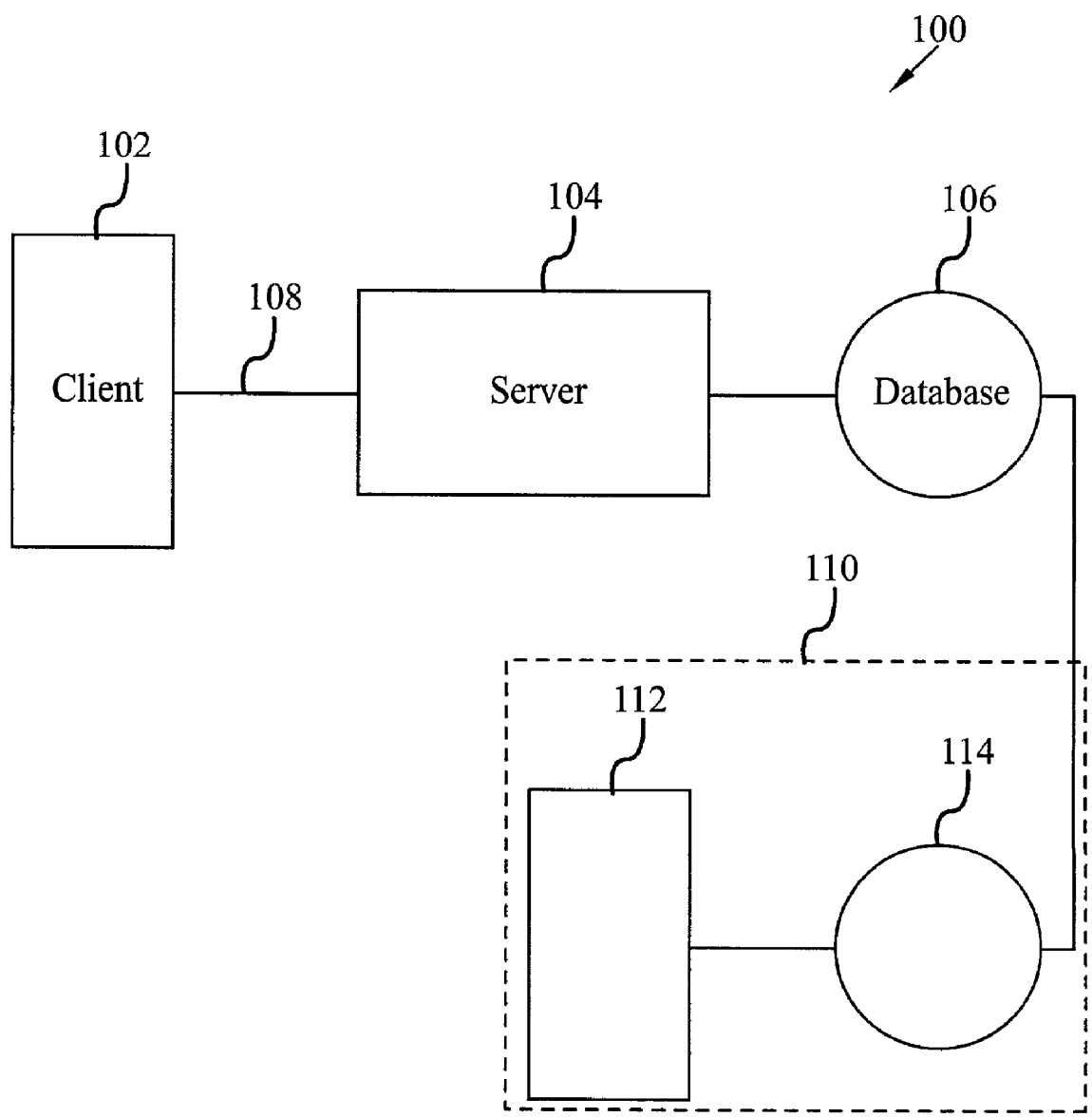
FIG. 1 is a block diagram of a computer network system.

Referring now in more detail to the drawings, FIG. 1 is a diagram illustrating a planing and scheduling system 100 including at least one client computer 102, a remote server 104 and remote database 106. Planing and scheduling system 100 includes the interface between remote server 104 and at least one client computer 102. For example, planing and scheduling system 100 includes an interconnection between client computer 102 and remote server 104 through a communication line 108. Computer network 100 also includes the interface between remote server 104 and remote database 106 (not illustrated) through a plurality of communication lines 110. This allows client computer 102 to access content stored on the remote database 106 via remote server 104. While FIG. 1 shows only one client computer 102, other clients can also be interconnected with remote server 104.

Remote server 104 is a computer such as a personal computer, file server, workstation, minicomputer, mainframe, or any other computer capable of communicating and interconnecting with other computers. Remote server 104 may include a processor, a printer, an input device such as a mouse and/or a keyboard, a monitor, a floppy disk drive, memory, a modem, and a mass storage device such as a hard disk drive. Communication lines 110 and communication lines 108 may be any type of communication link capable of supporting data transfer. For example, these communication lines may include any combination of an Integrated Services Digital Network ("ISDN") communication line, a hardwired line, a telephone link, a digital subscriber line, a cable connection, a fiber optic link or a wireless connection.

Client computer 102 may be similar to remote server 104 and may be implemented using virtually any type of computer. Client computer 102 may be a personal computer having a processor, a printer, an input device such as a mouse and/or a keyboard, a monitor, a floppy disk drive, memory, a modem, and a mass storage device such as a hard disk drive. Client computer 102 and remote server 104 will be operating under the control of an operating system such as MS-DOS, Macintosh OS, WINDOWS NT, WINDOWS 95/98/2000, OS/2, UNIX, XENIX, LINUX, BEOS and the like. Client computer 102 and remote server 104 each may utilize a different operating system. Client computer 102 and remote server 104 may execute any number of available application programs such as a web browser or web server.

Client computer 102 may communicate through server 104 using the Internet. For example, in the case where remote server 104 is configured as a web server, client computer 102, generally using a web browser application program, may couple to remote server 104 and provide the address or uniform resource locator (URL) of an Internet web page. Remote server 104 in response transmits the Internet web page back to client computer 102 using a web browser.

In operation, client computer 102 is a client tier running a web browser program to access a web site serviced by remote server 104. Remote server 104 is a middle tier running a production scheduling application. Client computer 102 accesses the application using a web browser or similar program. In the present invention, the application provides for planning and scheduling and utilizes a pre-induction module, a forecast module, a work completion module, a scheduling module and a report generation module. A user of client computer 102 is able to access and use the application using client computer 102. Client computer 102 accesses the application and through the use of informational screens supplied by remote server 104, the user is able to perform planning and scheduling tasks. Remote database 106 is a backend tier that can store the historic data from previous work orders as well as current work orders, where work orders are a complete set of maintenance or repair tasks that need to be done.

Although network interconnection 100 has been illustrated and described in FIG. 1 as being a node or interconnection on the Internet, network interconnection 100 may be any interconnection found on any computer network such as a local area network ("LAN"), a wide area network ("WAN"), an intranet, such as a corporate intranet, or any other communications and data exchange system created by connecting two or more computers. The present invention will be illustrated and described with an implementation using the Internet, however, it should be understood that the present invention is not limited to only implementations using the Internet.

Figure 2:
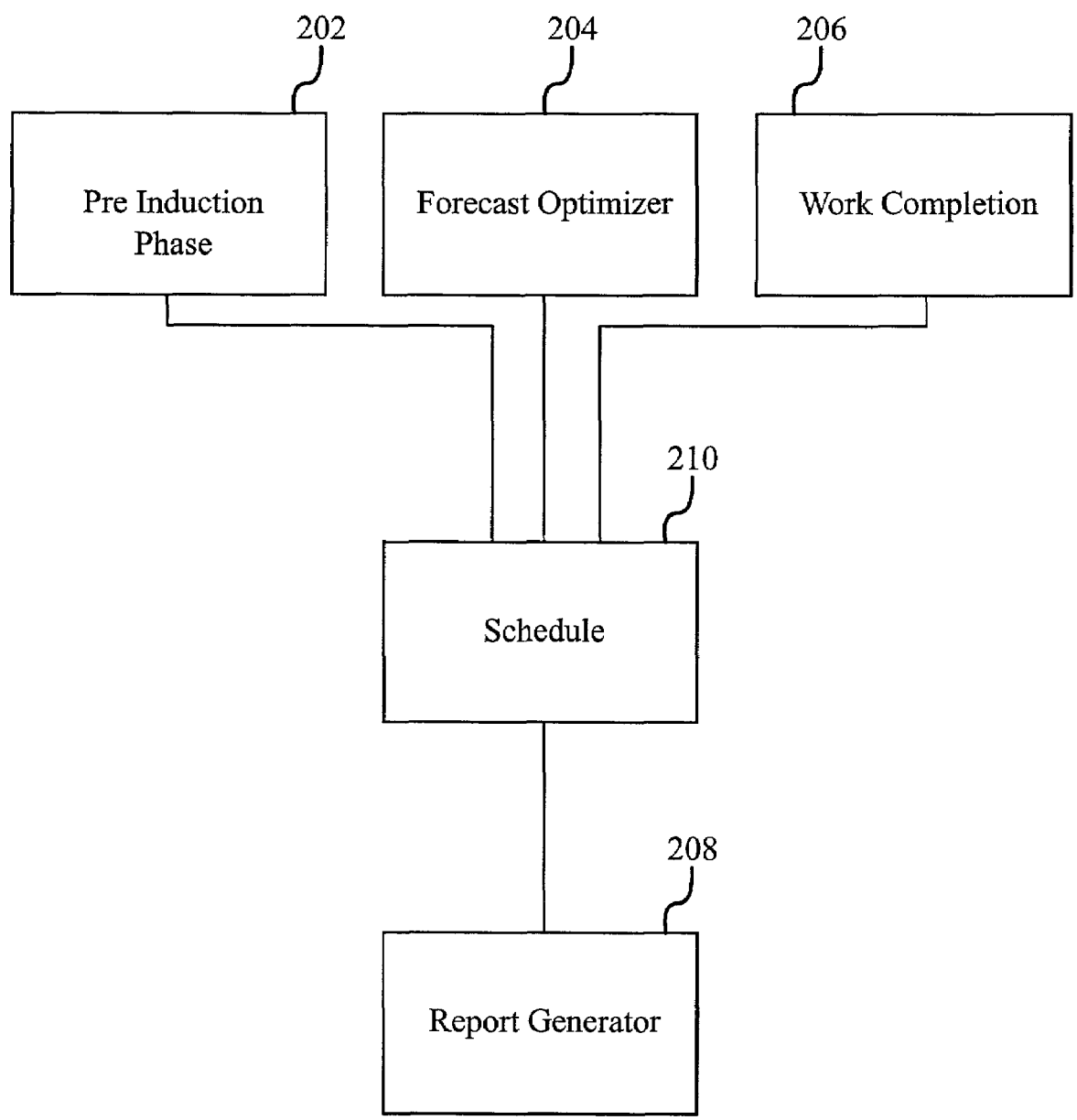
FIG. 2 is a block diagram of the modules of the planning application in accordance with the teachings of the present invention.

FIG. 2 is a block diagram of the modules of the planning application in accordance with the teachings of the present invention. Illustrated are a pre-induction module 202, a forecast/optimization module 204, a work completion module 206 and a report module 208. These modules interact and work with a schedule module 210.

Pre-induction module 202 is responsible for loading in the information regarding the various tasks that will define a complete job or inspection. In the present invention, individual tasks are represented as work cards. A job that may include many individual tasks, such as the inspection of an aircraft, are represented by work orders. Thus a work order consists of a collection of work cards. A schedule is produced from the work cards, their dependency on each other, the availability of resources and other factors.

Forecast/optimization module 204 allows a user to manipulate the schedule in order to perform "what-if" analysis on the schedule produced by schedule module 210. Also, forecasting can be done. Forecasting is done to project what might happen based on resource constraints such as tools or manpower.

Work completion module 206 receives updates from a worker or supervisor. In one embodiment, these updates are work cards whose designated tasks have been completed. When work cards are completed they are removed from active views on the schedule. Other updates may include additional work cards representing additional tasks that are non-routine or are modifications to the work order or other work cards.

The schedule module 210 generates schedules based on information received from the other modules. The schedule is typically displayed graphically. For example, each work card can be displayed with the start and stop date displayed as part of a task bar on a graph. Also, schedule module performs scheduling and planning using a critical path method with or without using a buffered threshold.

Report module 208 is used to format, generate and publish reports based on the planning and scheduling done by the other modules. Report module 208 features the ability to quickly design a report template, fill it with data and publish it to a remote server in a standard format.

The following description of the production scheduling invention will use aircraft inspection and maintenance as an example. It is obvious to those skilled in the art, however, that the present invention can be used to track the maintenance and inspection of any machinery as well as be used for other planning purposes.

Pre-Induction Phase

In order to start the planning and scheduling process, information regarding the work that needs to be done should be imported and characterized. The present invention uses two concepts for the work to be complete; the work card and the work order. The work card defines a specific task to be performed. A work card, in one embodiment contains a description of the job, the sequence of the job, which is an index of the work cards as layout in the proper order, the day and how the job is to be done, the shift the job is to be done such as graveyard or swing, the status of the job, the job priority, the milestone code for the job, which indicates the phase of execution of the job, the type of job, the work card number, the zone of the job which indicates where on the workpiece the job is to be done, the skill of the worker required to do the job, the estimated man-hours needed to complete the jobs and the actual numbers used to complete the job. Obviously, these are only exemplary categories and can change depending on the workpiece that is being worked on as well as other factors.

A work order is a collection of work cards that define a complete task, such as a comprehensive inspection or a maintenance procedure. A work order also includes such information as the start date and time of the work, the location of the work, an identification of what the work piece is, the number of work cards in the job and the number of unfinished work cards.

Prior to loading a work order into the system, an initial user first forms a plurality of work card templates. Work card templates are work cards that a user has already pre-entered information onto such as shift, priority, zone, skill, sequence and even how long the work might take. This is done before any work orders are loaded into the system. The information entered is based on historical information for the task and is entered by planning experts.

Figure 3:
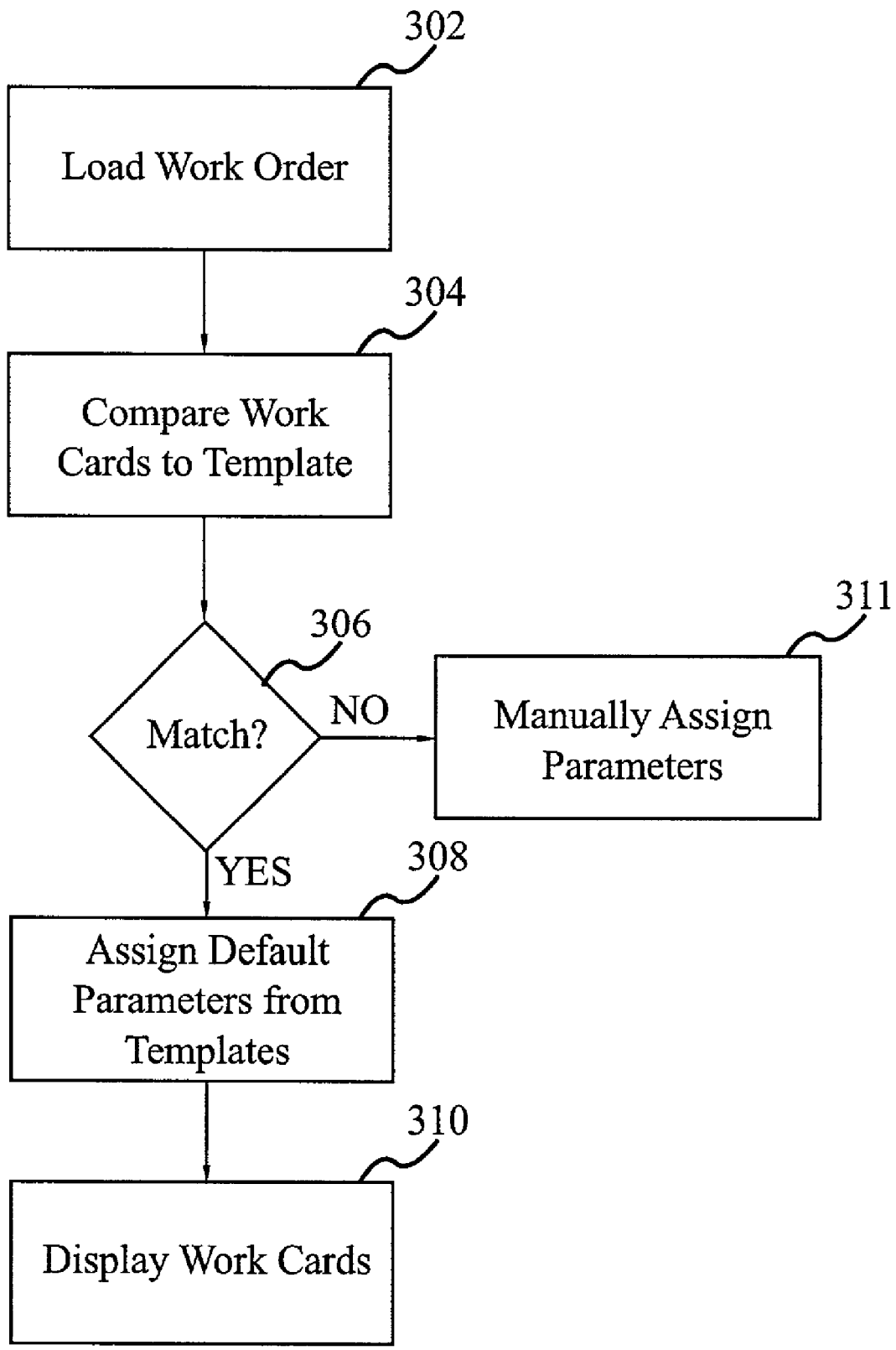
FIG. 3 is a flowchart illustrating the loading of a new work order into the system.
Figure 4:
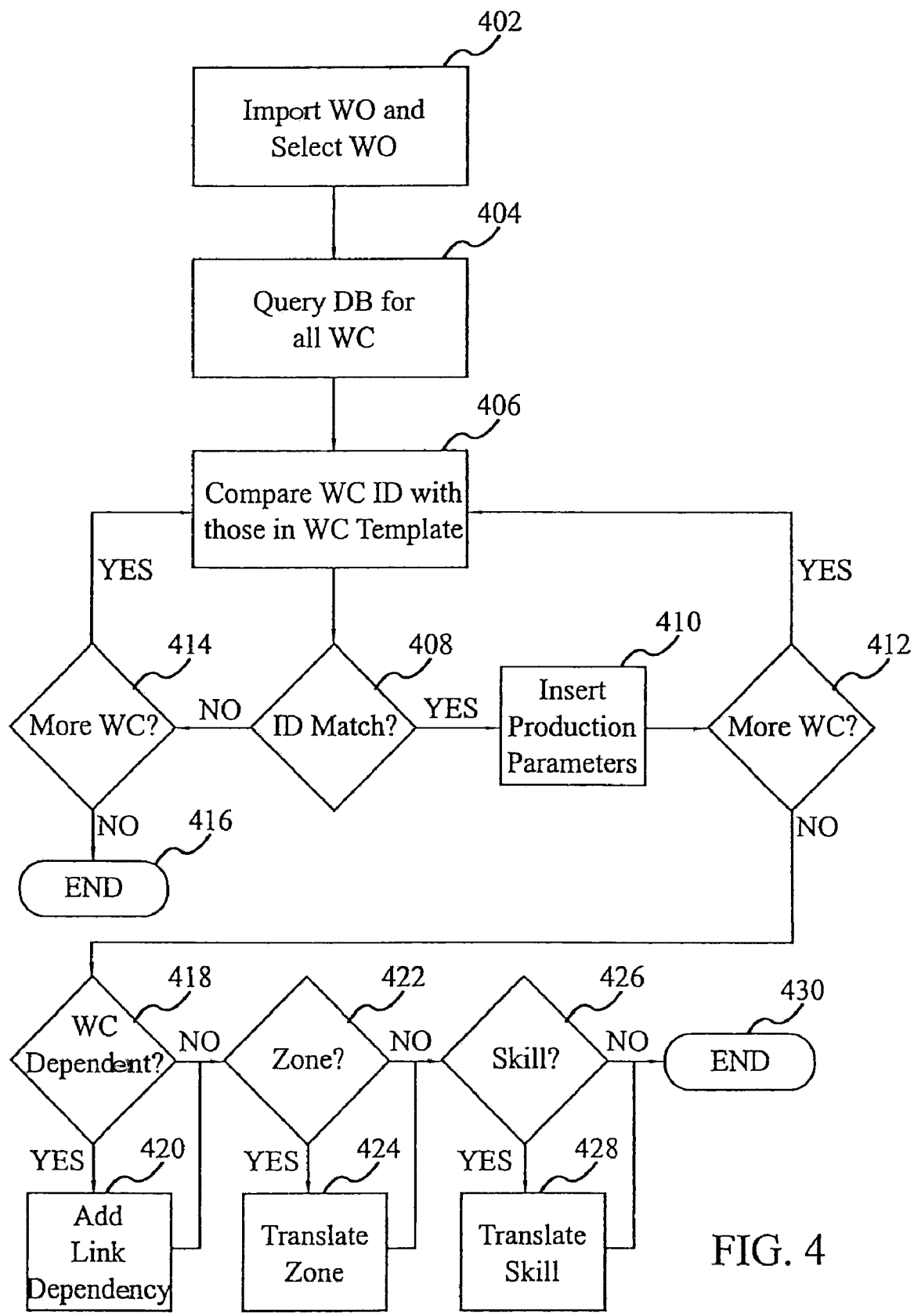
FIG. 4 is a flowchart illustrating the comparison of a work card from a work order to work card templates.

FIG. 3 is a flowchart illustrating the loading of a new work order into the system. In a first step 302, one or more work orders are loaded from a work order database. In step 304, each work card in the work order is compared to work cards in the work card template. FIG. 4 illustrates this process in detail. In step 306, it is determined if the work order work cards match a work card template. This process is more fully discussed in FIG. 4. If there is a match, the work cards in the work order are assigned the values from the work card template in step 308. As mentioned before, these values may include the priority, milestone codes, and production dates and hours. After this is done, in step 310, the work cards from the work order are inserted into a flow generator and the work cards are displayed, typically sorted by production date and hour. If there is no match in step 306, the unmatching work cards are sent to a "bucket" so that the user can manually enter the important data in step 311. A "bucket" is a file that collects the unmatched work cards until the scheduling information is entered. Different types of buckets exist for different types of work cards.

FIG. 4 is a flowchart illustrating the comparison of a work card from a work order to work card templates. In step 402, a work order is imported and selected. Then, in step 404, the work order is queried to extract all work cards. Then, in step 406, the work card identification numbers from the work order's work cards are compared with the work card identification numbers from the work cards in the work card template.

In step 408 it is determined if there is a match. If so, in step 410 the production parameters from the work card template are copied over to the work order's work card. In step 412 it is determined if that was the last work card to check for. If not, more work cards are compared in step 406.

If, in step 408, the identification did not match, in step 414 it is determined if more work cards need to be checked. If so, they are checked in step 406. If not, in step 416 the process ends.

Turning back to step 412, if there are no more work cards to match, the matching work cards are checked to see if a work card is dependent on another. If a work card has a dependency, the dependent work cards are linked together. A work card is dependent if its execution depends on the execution of another work card. For example, a pair of work cards may be finish-to-start linked. That is, the beginning of one work card can not start until another work card is completed. Also, work cards can be start-to-start linked. That is, the work cards must start at the same time. While these examples show two linked work cards, any number of work cards can be linked using any linking relationship. Other dependency may include finish-to-finish and finish-to-start. A link may incorporate a lag or lead time that requires the start or finish of a linked work card after a certain amount of delay or before a certain amount of delay.

After checking for dependent work cards, in step 422 the zone description is checked to see if it matches the zone description in the work card template. The zone is a location on the work piece, such as an aircraft. Different users may use different terms for a zone. For example, one user might use the term cockpit for a particular zone while another user may use the designation Al for cockpit. If the zone description differs between the work order's work card and the work card template, the zone description in the work order's work card is changed to match the work card template's zone description. In step 426, the skill description of the work order's work card is compared to the work card template. If there is a non-match, the work order's work card skill description is changed to match the work orders template description in step 428. The comparison process then ends in step 430.

Figure 5:
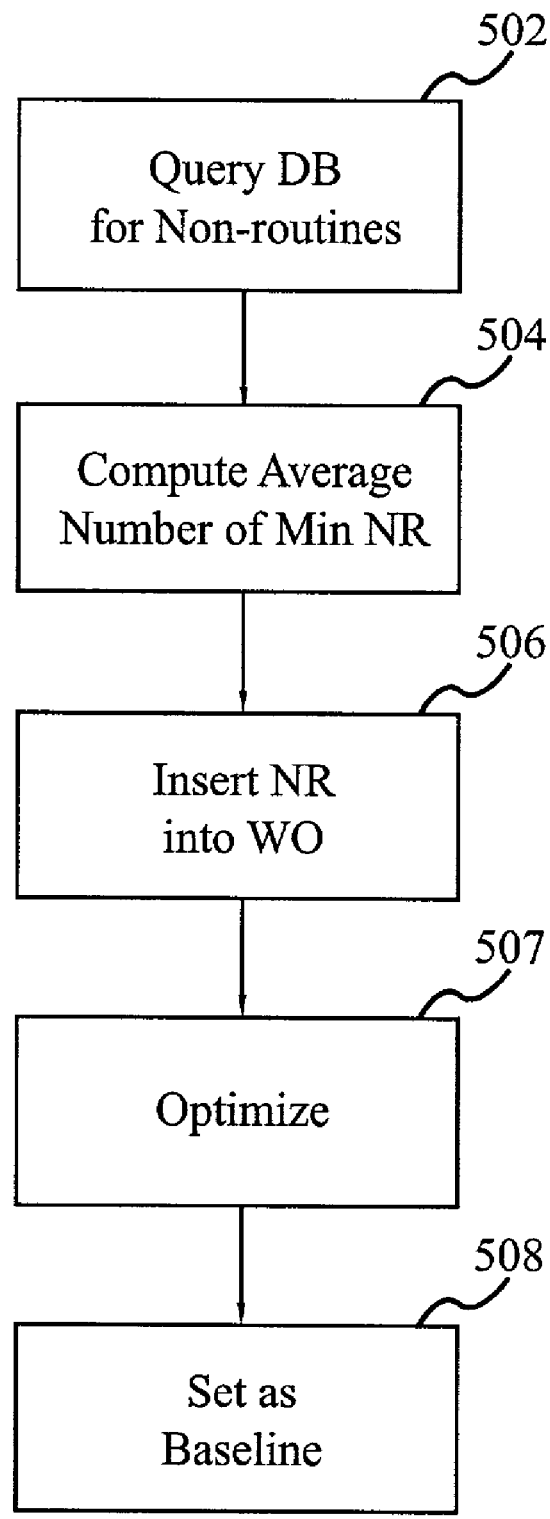
FIG. 5 illustrates the injection of the non-routine work cards.

After all the work cards are evaluated and either scheduled or sent to a holding bucket for later data entry, the present invention is able to adding expected non-routine work cards to the work cards of the work order. Expected non-routine work cards are tasks that, while not part of the work order, have historically arisen in conjunction with a given work order or work card. For example, a scheduled work order may call for the inspection of fan blades. Typically, when this occurs, the bolts holding on the cowl over the fan blades need replacement. The replacement is not part of the work order but arises enough to be an expected non-routine task. Knowing this information helps to make a more accurate schedule. FIG. 5 illustrates the injection of the non-routine work cards. In a first step 502, the external database 106 is queried for historical non-routines associated with a previously completed work order. Then, in step 504 the average minutes of a non-routine task is computed for each non-routine work card associated with the work order. In step 506, the work order receives the expected non-routine work order. Then, the demand and availability of resources such as man-hours are measured and the schedule is optimized using this information in step 508. Further details on optimization can be found in conjunction with FIG. 510. In step 512 the optimized schedule is set as the initial baseline schedule.

FIG. 6 is a screen shot showing an exemplary work card center 600. In this illustration, a number of work cards 502 are illustrated as a series of rows, with each row representing a different work card 602 for a different task. The collection of work cards 602 is the work order 604. Screen shot also includes an open box 604, which is selected to open an existing work order. Import button 606 is used to import a work order. Update button 608 is selected to update a work order. A work order might need updating when additional jobs are found related to the work order once the job starts. Additional tasks may be assigned to the work order by an engineer working on the project. Once a work order is loaded and displayed on a work card center 600, the update button 608 changes color to indicate an update is available for that work order. When the update button 608 is selected, the additional work cards are added to the work order. Selecting non-routine button 610 will bring up a listing of non-scheduled, non-routine work cards. Non-routine jobs are additional jobs found when the work order is being executed. These jobs represents additional work that is not usually part of the work order. For example, an inspection of a jet engine for a particular work order, a stress crack in a fan blade might be found. This would lead to a number of non-routine work cards to fix the fan blade.

Modification button 612 is selected to view non-scheduling modifications to work orders. Modifications are work cards that represent engineering orders that represent changes to what is done by a work order. When the modifications are uploaded to the work center, they can be assigned production schedule parameters such as shifting production day and production time. Then the modification job cards are added to the already scheduled work cards.

Suspend button 614 is selected to view suspended work cards. A suspended work card is a work card that cannot be completed due to a lack of resources such as tools or parts. The suspended work cards will stay in suspension until an unsuspend work card event is received in place of the suspended work card.

Routine button 616 is selected to view unscheduled routine job cards. Typically, these work cards are ones that were not matched to a pre-existing work card template. These need to have the production schedule parameters assigned. After that, they can be scheduled. Sequence button 617 sorts the card by sequence number, which is an index of the work card in the execution order. Sort button 619 allows sorting on any of the work cards fields.

Work card list 620 is a list of work cards in the current work list 604.

Work order box 622 lists the name of the current work order. Start date/time box 624 lists the start date and time the work is to begin and end date/time box 625 lists the end of the work order. Location box 626 lists the location where the maintenance is being performed. Aircraft type box 628 lists the specific type of aircraft such as DC10 or MD-L1011. In embodiments where other machinery besides aircraft is being worked on, this box will have a different name. Tail number box 630 lists the tail number of the aircraft that is assigned to a specific craft. Model number box 632 lists the model number of the aircraft. Operation day box 634 lists the overall day of the maintenance procedure. Total cards box 636 lists the number of work cards 502 for the work order 604. This is the number of work cards assigned to the project. Open cards box 638 lists the number of uncompleted work cards 602 in the work order 604.

Card set 640 allows the user to chose to se either all work cards, open (or pending) work cards or the closed (completed) work cards.

Figure 7:
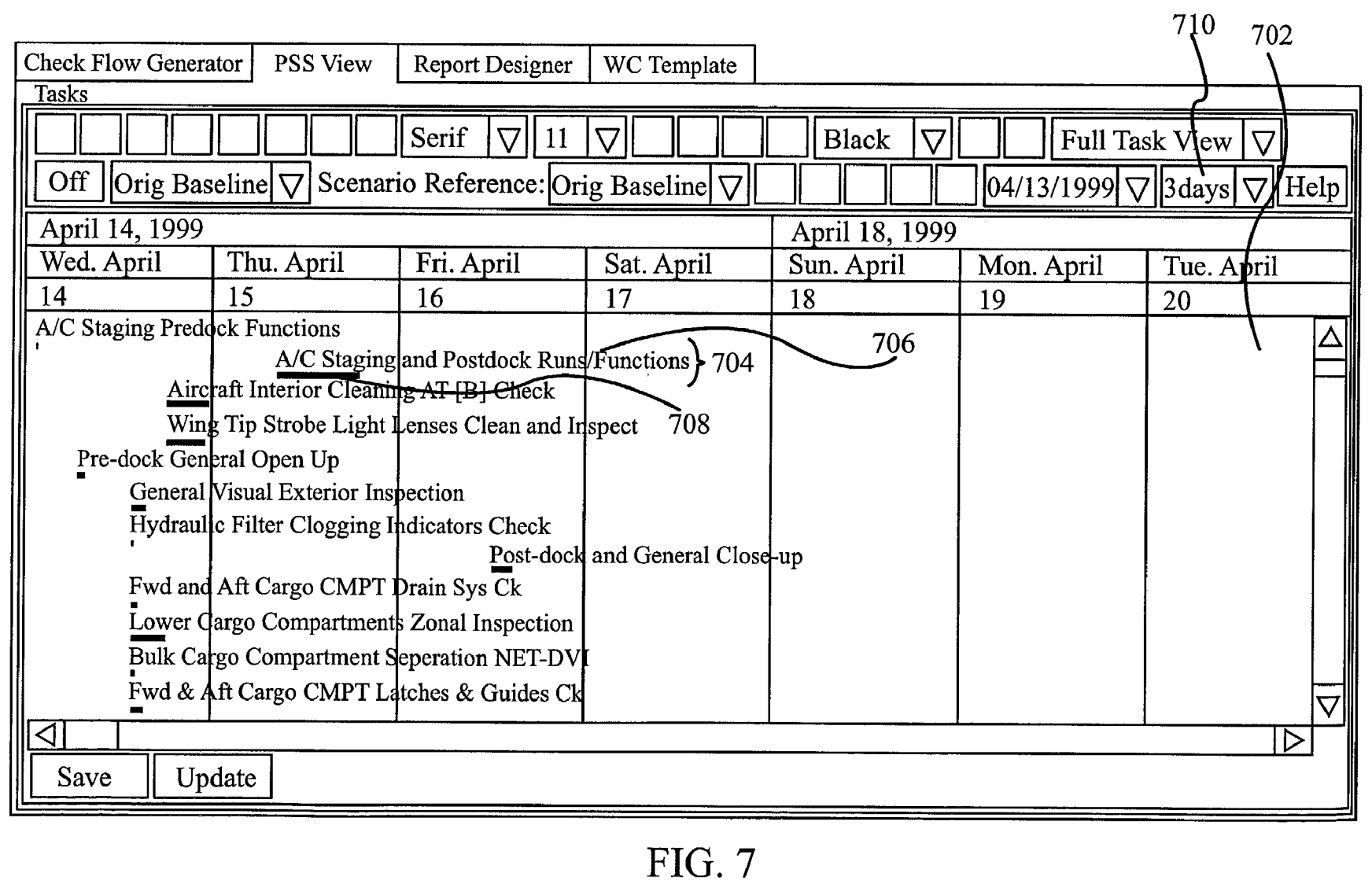

Check flow generator tab 642 allows a user to select the check flow generator screen, which is displayed in FIG. 7, check view tab 644 is selected to display a graphical representation of the schedule. Report generator tab 646 is selected to start the report generator, discussed in further detail later. WC template 648 is selected to start the WC template set up which allows the user to enter production parameters to a template in order to preflow the work cards.

FIG. 7 is a production schedule screen shot 700. It is displayed by selecting the check view tab 644 after a work order 604 has been loaded. Schedule 702 shows a job 704 that includes its name 706 and a bar 708 indicating how long the project is scheduled to last. The placement of the job on the table corresponds to the start hour and date. The view can be set to view a schedule for any number of days selecting day view box 710.

Planning and Control Phase

In the planning and control phase, workers perform each task on the work cards. As tasks are performed, the progress can be entered on terminals at the repair location. This will update the database with the completed work cards. Also, non-routine work cards, suspended work cards and modification work cards can be entered at this time. All of this will then be entered into the work order database.

Figure 8:
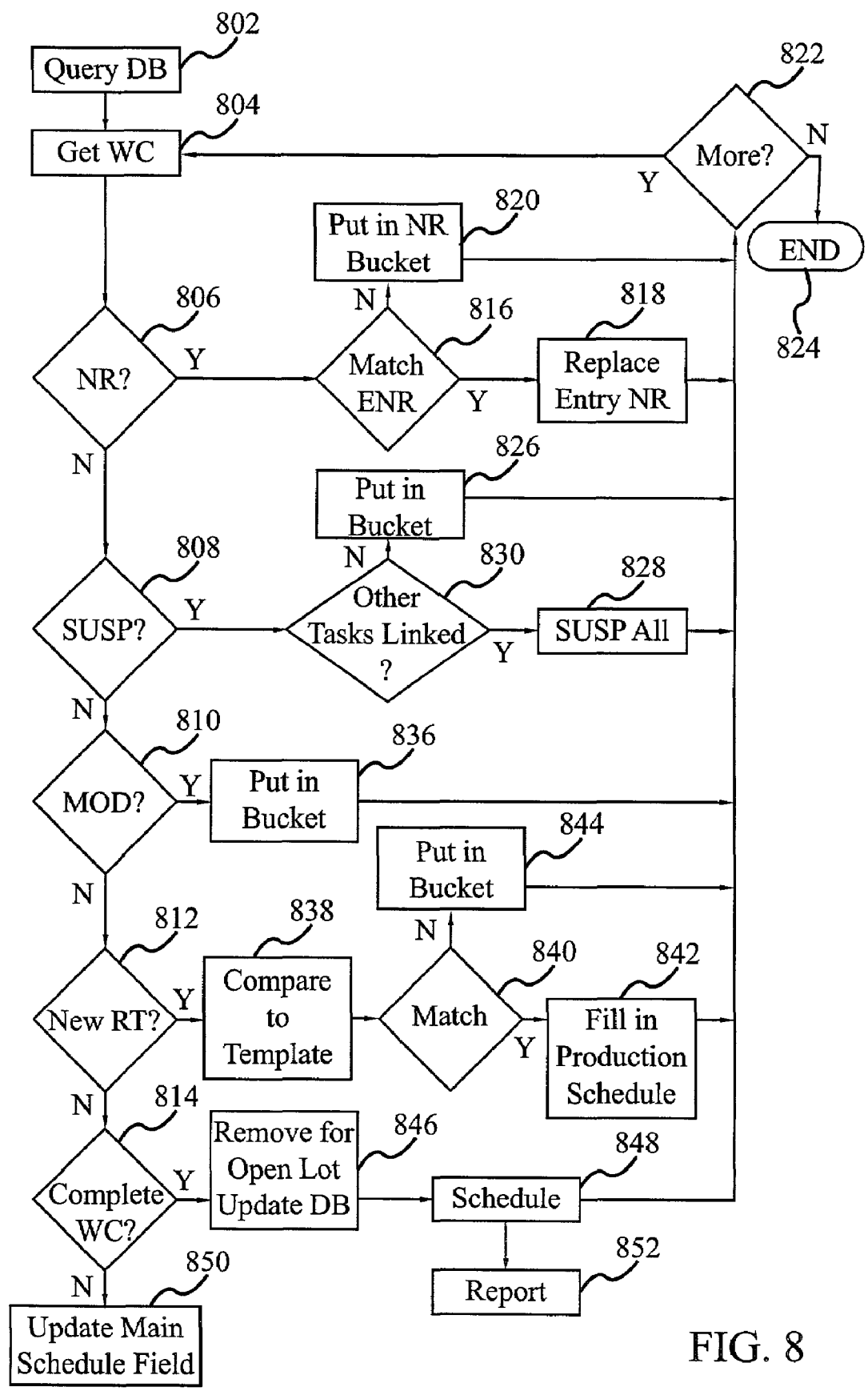
FIG. 8 is a flow chart illustrating the production and control phase.

FIG. 8 is a flow chart illustrating the production and control phase. In step 802, a work order database is populated. In one embodiment, this can occur when a user of external production computer 112 enters information. In step 804, the update to the work order is loaded into the client computer 102 by a user selecting the update button 608 from the work card center 600. The update and new work cards are loaded into the system.

In step 806, work cards are examined to determine of it is a non-routine work card. If the work card is non-routine in step 816 it is determined if the non-routine work cards match any of the estimated non-routines already in the remote database 106. If so, in step 818 the non-routine cards replace the estimated non-routine cards. If there is no match in 816, then the non-routine work cards are placed in a bucket to be manually entered.

In step 808 it is determined if the work card is a suspended card. If so, in step 820 it is determined if the suspended card is dependent or linked to other cards. If so, in step 828 the suspended work card and all the ones linked are added to the suspended bucket for later processing. If, in step 820, no work cards are linked, the one suspended card is added to the suspended bucket in step 830.

In step 810 it is determined if the work card is a modification work card. If it is, it is placed in a modification bucket for further processing.

In step 812, it is determined if the work card is a new routine work card. If so, in step 838, the new routine cards are compared to the work cards in the work card template. If, in step 840, a match is determined, then in step 842, the production schedule information is then filled into the new non-routine work card. If there is no match in step 840, the new non-routine work cards are sent to a bucket for manual scheduling.

If, in step 814, it is determined if the tasks assigned by the work cards are completed. If so, in step 840, the work card is removed from the open display and the information regarding the work card is maintained in the remote database 106. In step 848, the schedule is regenerated. If the work card is not completed or suspended in step 814, in step 850 the non-schedule fields from the work cards are updated. This may include updates to the man-hours or other non-scheduling parameters. Then, in step 848, the schedule is regenerated. In step 852, schedule reports and charts can be generated and published.

Forecasting and Optimization

Once a schedule is completed, various analyses can be performed on the schedule to assist a planner in finalizing the schedule. The first of these is the what-if analysis. The what-if analysis compares the baseline schedule with other schedule configurations. Turning back to FIG. 7, FIG. 7 illustrates a graphical representation of the schedule. To perform a what-if analysis, a user selects what-if button 710 to turn the what-if function on. Then, the user highlights one or more work cards to be rescheduled and, using a mouse or similar device, drags the task bars representing the work cards and then shifts the work cards back in time (dragging the task bars to the right) or forward in time (dragging the task bars to the left). This reschedules the work cards and the work order. Work cards that are linked are moved together. Also, what-if scenarios can be automatically done by running a forecast/optimization procedure and saving the results as a what-if scenario. Forecast procedure will be discussed in greater detail below. Then the record what-if button 712 is selected to record the what-if move. The what-if scenario is stored on the first what-if stack 714 and the second what-if stack 716. The original baseline schedule also appears on both stacks. A user can compare any what-if scenario from the first what-if stack 714 with any what-if scenario from what-if stack 716. Thus changes to a schedule can be quickly and easily evaluated. Also, by storing various what-if scenarios on the stack, previous what-if scenarios can be recalled and displayed.

After the what-if scenarios are compared a report is generated listing the differences between the two scenarios that are compared. These can be such things as a new completion date, a listing of work cards that have changed and the like. Thus a user can quickly see the impact proposed changes will have to the over all schedule.

Figure 9:
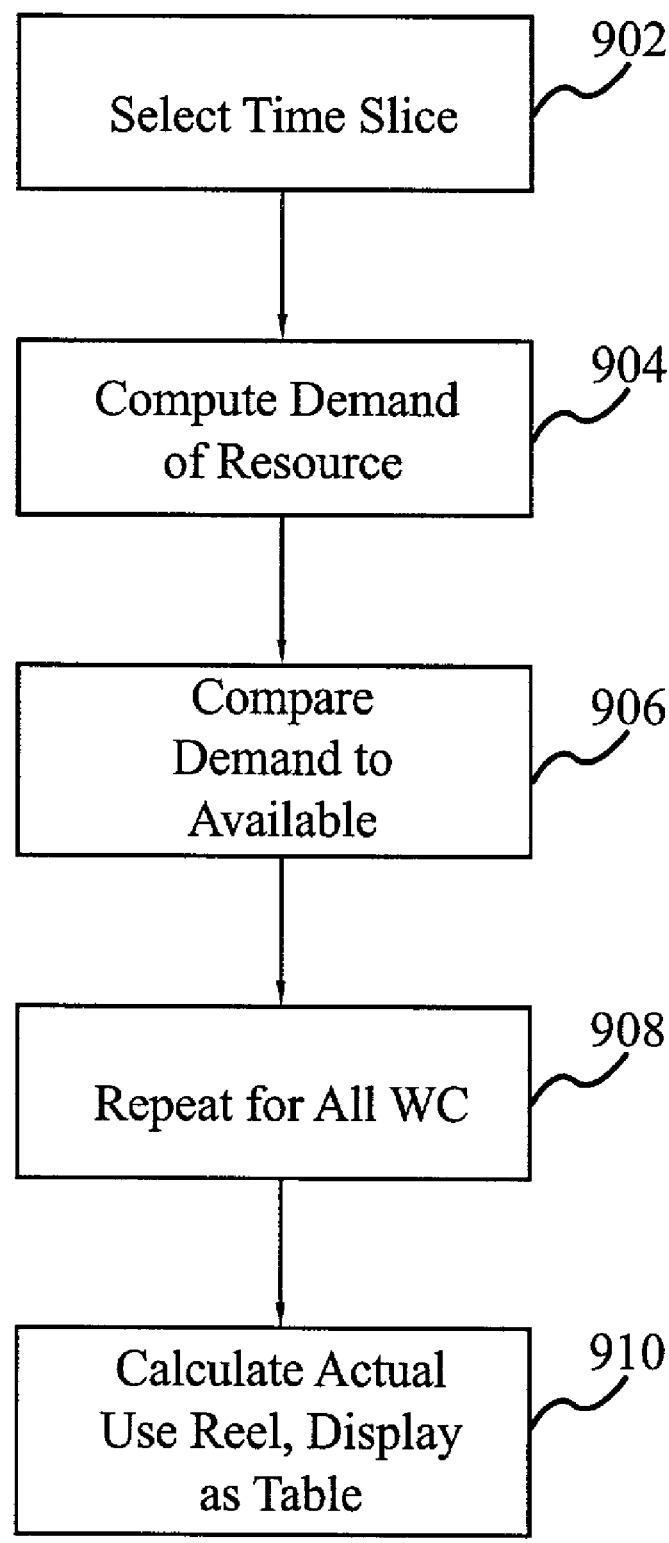
FIG. 9 is a flowchart illustrating the forecasting process.

Additionally, a user can plan for variances in resources such as man-hours, tools and the availability of skilled workers by using a forecast tool. FIG. 9 is a flowchart illustrating the forecasting process. In step 902, a set time slot, such as one day or one shift, of a work order is examined. The amount of needed resources (the demand) for that time slice is determined in step 904 and is the sum of the man-hours required to complete the scheduled work cards. In step 906, the demand found in step 904 is compared to the actual amount of the resource available. In one embodiment, the resource is man-hours. The resource could also be skilled hours, tools and the like. In step 908 the process of steps 902 through 906 are repeated for all time slices. Then, in step 910, the amount of actual versus needed resources is calculated. This can be displayed in a table.

Figure 10:
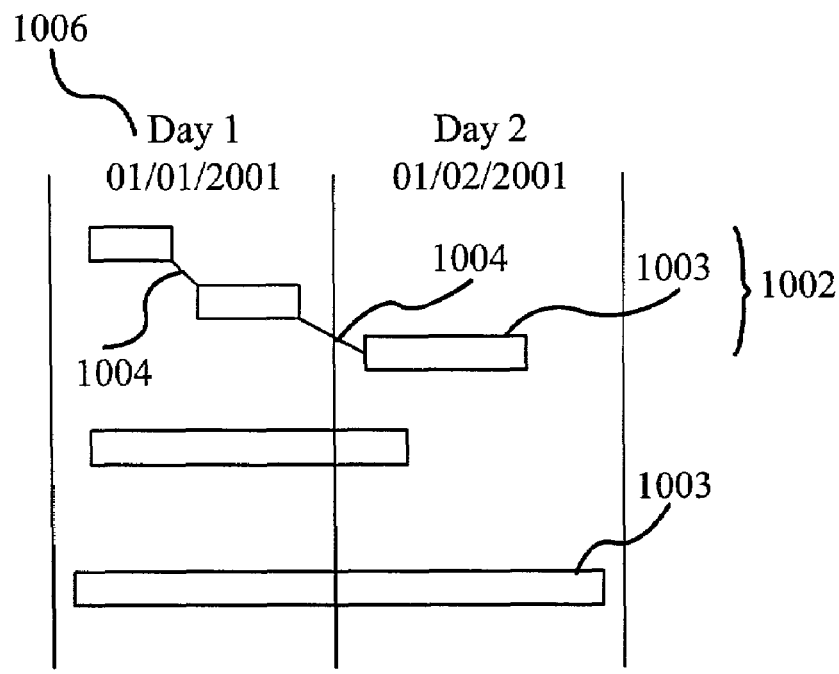
FIG. 10 illustrates an exemplary schedule with a forecast table.

FIG. 10 illustrates an exemplary schedule with a forecast table produced as described in FIG. 9. In this example the resource being forecasted is man-hours. Schedule 1002 has a plurality of task bars 1003, which represent the work cards. The length of the task bar is indicative of the length of the task. In this example, a link 1004 exists between some of the work cards. This represents the fact that the execution of the work cards are, in some fashion, related. The date columns 1006 represent one complete day. This will be chosen as the time slice. Thus for the date marked Jan. 1, 2001 there are number of work cards that fall within this day. The number of hours needed to complete these tasks are listed in needed hours column for the date Jan. 1, 2001 of table 1010. For the next time slice, Jan. 2, 2001, the number of hours represented by the work cards falling into this time slice is calculated and entered into table 1010. The actual number of hours of workers available that day are entered by the user in the appropriate places in table 810 or can be read off a database. The over or under hour values are automatically calculated and entered in the appropriate space. The end result is a table listed the different dates and how many hours over or under the project will be for that time slice.

Figure 11:
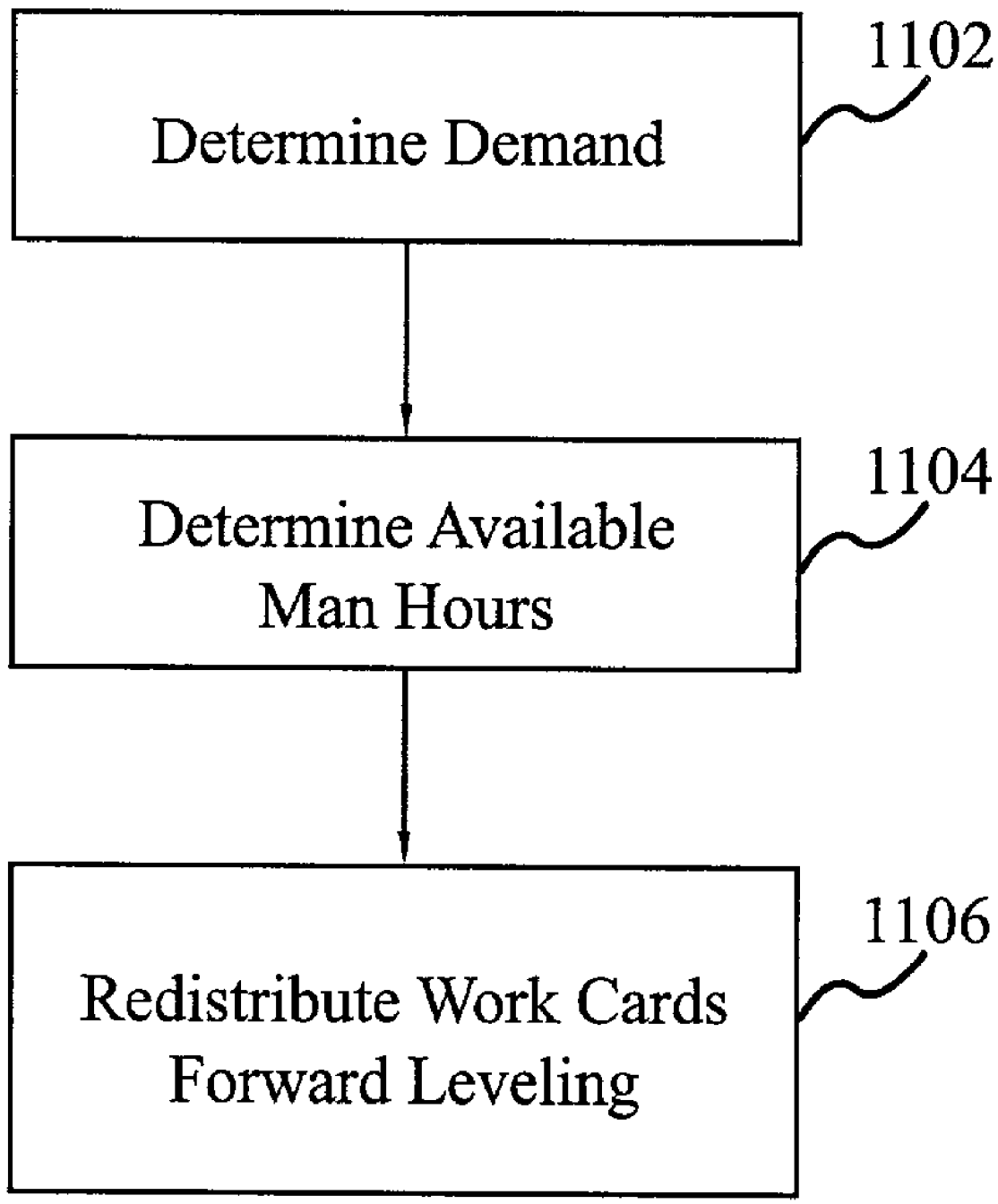
FIG. 11 illustrates a flowchart for leveling optimization.
Figure 12:
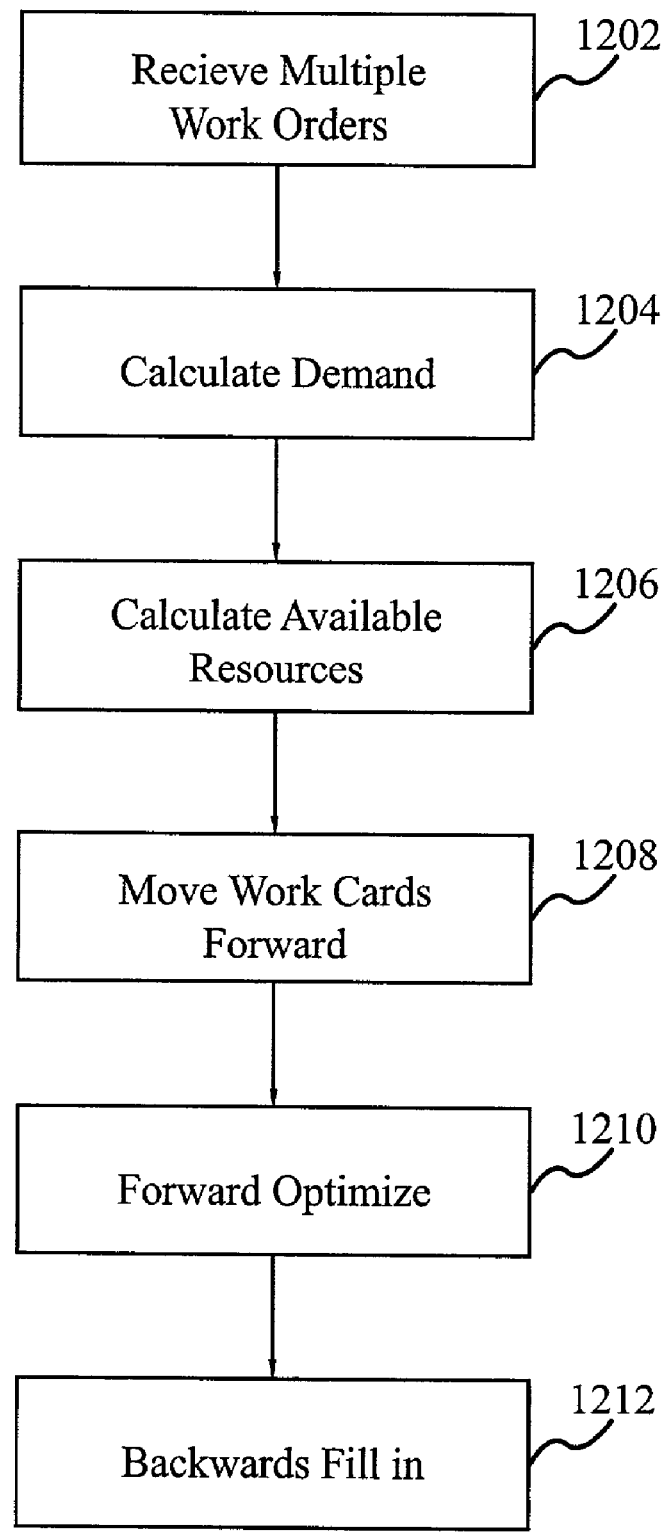
FIG. 12 is a flowchart illustrating the optimization of multiple work charts.

The present invention can also perform automatic optimization. One optimization method is a leveling optimization. FIG. 11 illustrates a flowchart for leveling optimization. In step 1102, the needed amount, or demand, of a resources, such as man-hours, for a given work order is determined. Next, the available man-hours are determined in step 1004. Then, in step 1006, using the scheduled work order, the work cards are redistributed throughout the schedule such that the demand for a given time period matches the available labor. This gives a new, optimized schedule. The optimized schedule can be recorded as a what-if scenario as discussed previously and then the optimized schedule can be compared to a baseline and a list of changes can be generated for easy reference. Multiple work orders can also be optimized. For example, if there is a facility with a work order for one aircraft, work order A, and a work order for a second aircraft, work order B. Both work orders will be using the same pool if workers. However, one of the aircraft, due to operational needs, may need to be complete earlier than the other aircraft. A multiwork order optimization scheme is able to optimize the work orders. FIG. 12 is a flowchart illustrating the optimization of multiple work orders. In a first step 1202, multiple work orders are received by a client. In step 1204, the demand for the work orders is calculated. In step 1206, the actual amount of the resource available is calculated. In step 1208, all of the work cards are moved all the way forward except for those that are linked via a dependency to another. Those links remain. Then, in step 1210, going forward in time the work cards are distributed to even out the resource demand. While this is happening, the required by date for the aircraft that needs to be completed first is used as a can not break scheduling date. That way, it is completed first and by the needed time. After all the work cards are scheduled going forward, in step 1212, the work orders are searched for any openings where a work card could move backwards to fill in gaps where there might be available time.

Scheduling

Work cards in a given work order that have scheduling information are automatically scheduled. Changes to work cards also automatically update the schedule. One advantage of the present invention is that once a work order is scheduled, it can be viewed in several different ways.

For example, turning back to FIG. 7 is a screen shot showing a schedule containing individual work cards listed by start date with a bar indicative of how much time that job is estimated for.

Figure 13:
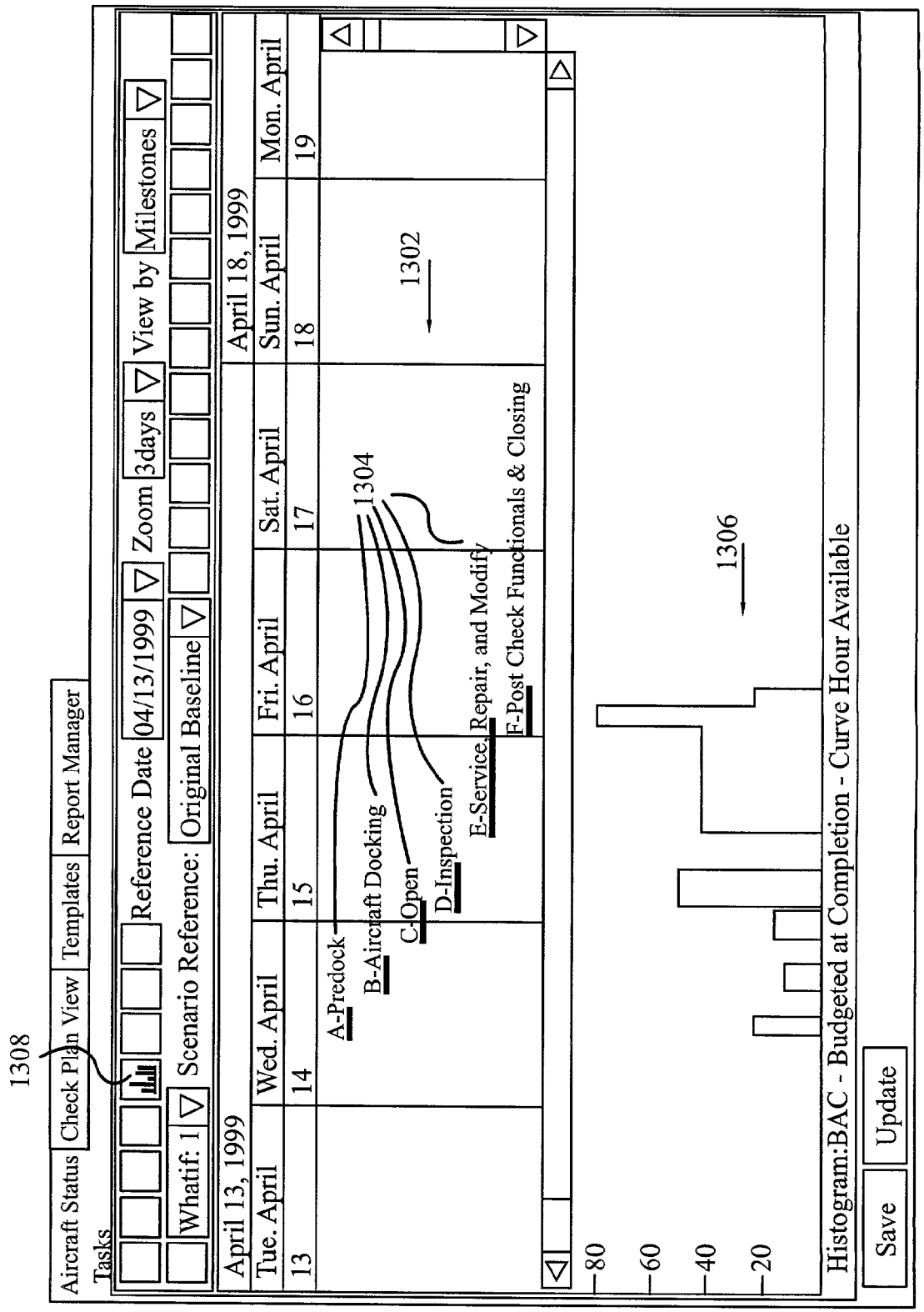
FIG. 13 is a screen shot of an alternative view of the schedule

FIG. 13 is a screen shot of an alternative view of the schedule. The graphic elements on chart 1302 are not work cards but by major portions (milestones) of a work order. Illustrated are milestone markers 1304. The length of the marker determines the amount of time needed to complete the milestone. The schedule can also be viewed by zones (portions of the aircraft), skills of the worker, shift attendance and the like.

FIG. 13 also illustrates a histogram 1306. Histogram 1306 in one embodiment shows the budgeted number of man-hours. A curve representing the actual man-hours of labor available can be overlaid on the histogram. This can be helpful to visually see the demand versus the availability. Histogram 1306 can be displayed or hidden by selecting histogram button 1308.

Figure 14:
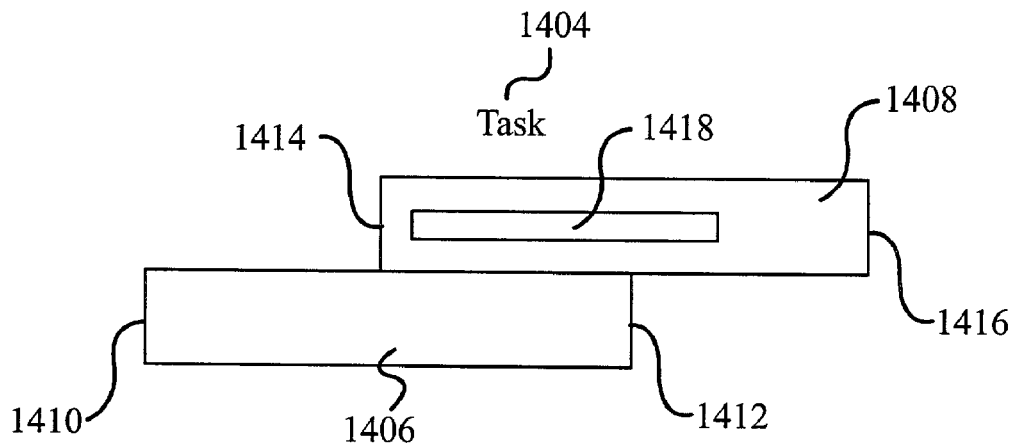
FIG. 14 illustrates a task bar.

FIG. 14 illustrates a task bar 1402 that is used in the schedule graphs. Task bar 1402 includes a label 1404 which indicates the description of the task. Also included are a plan bar 1406 and an actual bar 1408. Plan bar 1406 has a plan start date 1410 which is the left edge of the plan bar 1406 and represents the day and hour the task was planned to start and a plan and date 1412 which is the right-hand edge of the plan bar 1406. Actual bar 1408 has an actual start date 1414 which is the left-hand side of actual bar 1408 and represents an actual start date. Actual end date 1416 is the right-hand side of actual bar 1408 and represents an actual end date. Actual bar 1418 typically located inside actual bar 1408. Progress bar 1418 lengths from left to right in proportion to work completed. Thus, a user of the present invention can quickly tell the progress and status of a particular work card (job), a milestone or other task indicator.

The present invention additionally utilizes several algorithms to implement the scheduling function. The scheduling module can utilize the critical path method for planning. In the critical path method the critical path is defined as the most vital series of interlocking activities in a project. All other activities arise from and depend on the execution of the task in the critical path. Thus, by controlling the critical path, overall project time is controlled. A user can set the critical tolerance of a task which determines how close a task is to the critical path.

A user can also choose to use a buffer threshold. The buffer threshold is the delay that can be permitted in a given task before it begins to effect some other parameter such as a milestone, a work shift, a zone or a work order. The buffer for a given task is determined by subtracting the earliest expected completion date from the latest allowable completion date. When buffer threshold is used, tasks can get the most out of available manpower by using the available float time of each task without impacting the critical path. A task becomes near critical when its threshold buffer time is less than the critical tolerance. Using the buffer threshold helps to cut down project span time, expedite planning efforts, eliminate stand by time, spot variation in time, cut time required for routine decisions, and allow more time for decision making.

The present invention can calculate start dates by performing calculations both forward and backward through the network plan. That is, the scheduling module can make calculations forward in time by moving through the network plan from left to right to determine the earliest expected start and completion dates for each phase of the work order. For the backward pass calculation, the calculation attempts to find the latest available start and completion date for each part of a work order. This is done by calculating backwards through the network plan.

After calculating the expected elapsed time (TE), the next step is to sum these times throughout the various network paths to determine the total expected elapsed time for the event. This accumulated work card time establishes the expected end date for the work order. TE is also calculated for other events in the network and it is expressed as time duration.

The last end date, LE, is defined as the latest calendar date on which an event can occur without creating an expected delay in the completion of the work order. The LE value for a given event is calculated by subtracting the sum of the expected times (TE) for the work cards on the longest path between the given event and the end event of the event from the latest date for completing the project.

The buffer-threshold is the difference between the latest allowable date and the expected date; buffer threshold=TL−TE. It can have a positive or zero value. The threshold buffer is said to exist when the latest allowable date (LE) is later than the work card expected date (TE).

The path in the network that has minimum threshold buffer is the longest time path and therefore is called the critical path. It is characterized by the fact that slip in activity time along the critical path will cause equal slip in the expected completion date of the work order. All events along this path have a zero buffer threshold value. Zero buffer-threshold occurs along a path when LE=TE for all events on the path through the network.

When using the buffer threshold constraints, the present invention firmly fixes the TL value so that the event is not affected by subsequent internal processing of detailed networks. For example, when the threshold policy is set to "Ignore Buffer Threshold", the user can move a work card beyond the project end date and impact the work order completion date. By the same token, when the threshold policy is set to "Use buffer threshold," the scheduler will not allow the user to move a work card pass its threshold. This means that the work card will move as long as there is a threshold greater than zero.

Figure 15:
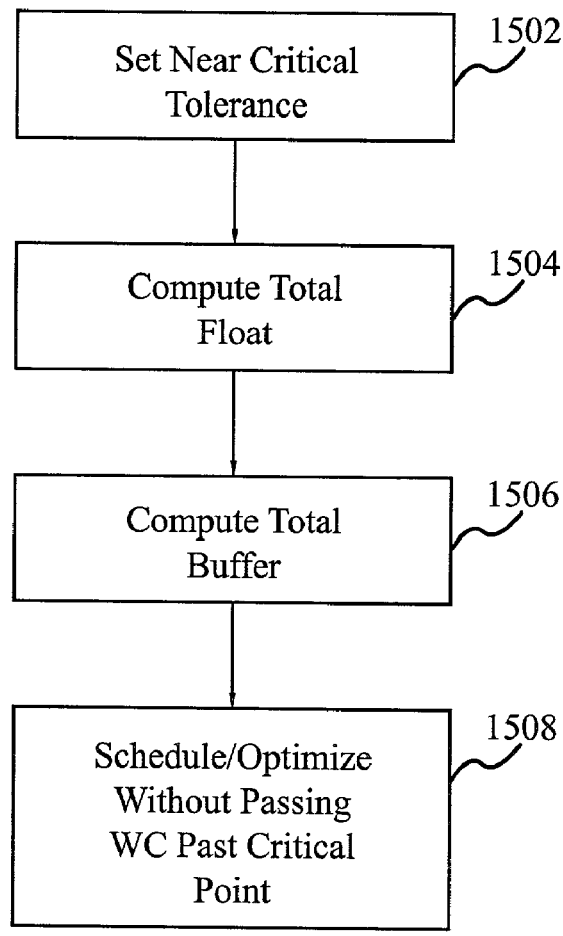
FIG. 15 is a flowchart of buffer threshold scheduling.

FIG. 15 is a flowchart illustrating the buffer threshold scheduling. In step 1502, a near critical time is set by a user. In step 1504, the total float of all work cards is computed. For the case of calculating by a work order, the float of a work card is the amount of time between the end of a work card and the end of the work order. In step 1506, the buffer is completed. For a work card/work order situation the buffer and the float is the same. If the scheduling was based on a milestone work card scenario, the buffer is the length of time between the end of a work card and the end of the milestone. In step 1508, scheduling is done by going forward and backward through the work card. However, work cards can not be moved back in time past a critical point (the end of a milestone, end of a work order). Linked work cards can not be moved once the last work card in the chain reaches a critical point. In the time between the critical point and the near critical time, if a work card falls in this period, the color of its task bar changes to denote the near critical nature.

Report Module

Report module 208 is used to format, generate and publish reports based on the planning and scheduling done by the other modules. Report module 208 features the ability to quickly design a report template, fill it with data and publish it to a remote server in a standard format.

While the invention has been particularly shown and described in the foregoing detailed description, it will be understood by those skilled in the art that various other changes in form and detail may be made without departing from the spirit and scope of the invention.

The invention claimed is:

1. A computer-implemented method of production scheduling, comprising:
   loading a plurality of work orders from a database, each work order containing a plurality of work cards to define a plurality of tasks associated with the work order;
   comparing the plurality of work cards for each work order to a work card template, including the steps of,
   (a) extracting the plurality of work cards from a work order;
   (b) comparing work card identification numbers from the plurality of work cards from the work order to work card identification numbers from a plurality of work cards from the work card template;

(c) matching a work card identification number from one of the plurality of work cards from the work order with a work card identification number from one of the plurality of work cards from the work card template, then copying production parameters for a job associated with the matching one of the plurality of work cards from the work card template to the matching one of the plurality of work cards from the work order, the production parameters including at least a work card number, description of the job, sequence of the job, temporal data related to the job, status of the job, priority of the job, milestones for the job, execution phase of the job, and man-hours needed to perform the job;

(d) for each matching work card, determining dependency to other work cards from the work order, the dependencies including at least start-to-start dependency, start-to-finish dependency, finish-to-start dependency, and finish-to-finish dependency;

(e) for each dependency found in step (d), linking the work cards found to be dependent;

(f) comparing zone location of a work piece associated with the job on the work card from the work order with zone location of a work piece associated with the job on the work card from the work card template and, if found to differ, changing zone location on the work card from the work order to match zone location on the work card from the work card template; and (g) comparing skill of worker needed for the job on the work card from the work order with skill of worker needed for the job on the work card from the work card template and, if found to differ, changing skill of worker on the work card from the work order to match skill of worker on the work card from the work card template;

adding work cards found in the work card template but not found in the plurality of work cards from the work order to the plurality of work cards to the work order, including the steps of, (h) querying the database for non-routine work cards associated with the work order;

(i) computing time for each non-routine work card associated with the work order;

(j) inserting each non-routine work card into the plurality of work cards for the work order;

(k) optimizing scheduling of the work order with the non-routine work cards inserted into the plurality of work cards in terms of demand and availability of resources; and (l) setting a baseline schedule of the work order according to the optimized schedule from step (k);

displaying the work order with table format with each row representing one of the plurality of work cards from the work order, the display including a plurality of boxes for selecting a work order, importing a work order, updating work cards within the work order, displaying non-routine work cards, modifying work cards within the work order, suspending work cards within the work order, viewing unscheduled work cards with the work order, and switching the display to graphical format;

performing the plurality of tasks on the plurality of work cards from the work order;

updating the database upon completion of each of the plurality of tasks on the plurality of work cards from the work order, including the steps of, (m) updating non-routine work cards; and (n) if the work card is suspended, then suspending work cards dependent upon the suspended work card;

updating the display to remove completed and suspended work cards; performing what-if scenarios of the production schedule by revising the production parameters for the plurality of work cards from the work order, including the steps of, (o) selecting a production parameter to revise;

(p) selecting a time slot in the production schedule;

(q) determining resources needed to meet revised production parameters;

(r) comparing resources needed to meet revised production parameters with available resources;

(s) repeating steps (p) through (r) for each time slot in the production schedule;

(t) repeating steps (o) through (s) for each production parameter to be considered;

(u) recording each what-if scenario in the database; and (v) determining an optimal production schedule by finding which what-if scenario provides maximum usage of the available resources; and scheduling the work order according to the optimal production schedule, including the steps of, (w) determining start date of the work order by calculating earliest start and completion dates and latest start and completion dates for each of the plurality of work cards from the work order; and (x) determining end date of the work order by calculating elapsed time for each of the plurality of work cards from the work order, including a critical path for a longest time through the plurality of work cards from the work order; and (y) displaying the production schedule.

2. The computer-implemented method of claim 1, further including the step of providing a graphical user interface (GUI) to the production scheduling process for a user.

3. A computer system for executing a production schedule, comprising:

means for loading a plurality of work orders from a database, each work order containing a plurality of work cards to define a plurality of tasks associated with the work order;

means for comparing the plurality of work cards for each work order to a work card template, including, (a) extracting the plurality of work cards from a work order;

(b) comparing work card identification numbers from the plurality of work cards from the work order to work card identification numbers from a plurality of work cards from the work card template;

(c) matching a work card identification number from one of the plurality of work cards from the work order with a work card identification number from one of the plurality of work cards from the work card template, then copying production parameters for a job associated with the matching one of the plurality of work cards from the work card template to the matching one of the plurality of work cards from the work order, the production parameters including at least a work card number, description of the job, sequence of the job, temporal data related to the job, status of the job, priority of the job, milestones for the job, execution phase of the job, and man-hours needed to perform the job;

(d) for each matching work card, determining dependency to other work cards from the work order, the dependencies including at least start-to-start dependency, start-to-finish dependency, finish-to-start dependency, and finish-to-finish dependency;

(e) for each dependency found in step (d), linking the work cards found to be dependent;

(f) comparing zone location of a work piece associated with the job on the work card from the work order with zone location of a work piece associated with the job on the work card from the work card template and, if found to differ, changing zone location on the work card from the work order to match zone location on the work card from the work card template; and (g) comparing skill of worker needed for the job on the work card from the work order with skill of worker needed for the job on the work card from the work card template and, if found to differ, changing skill of worker on the work card from the work order to match skill of worker on the work card from the work card template;

means for adding work cards found in the work card template but not found in the plurality of work cards from the work order to the plurality of work cards to the work order, including the steps of, (h) querying the database for non-routine work cards associated with the work order;

(i) computing time for each non-routine work card associated with the work order;

(j) inserting each non-routine work card into the plurality of work cards for the work order;

(k) optimizing scheduling of the work order with the non-routine work cards inserted into the plurality of work cards in terms of demand and availability of resources; and (l) setting a baseline schedule of the work order according to the optimized schedule from step (k);

means for displaying the work order with table format with each row representing one of the plurality of work cards from the work order, the display including a plurality of boxes for selecting a work order, importing a work order, updating work cards within the work order, displaying non-routine work cards, modifying work cards within the work order, suspending work cards within the work order, viewing unscheduled work cards with the work order, and switching the display to graphical format;

means for performing the plurality of tasks on the plurality of work cards from the work order;

means for updating the database upon completion of each of the plurality of tasks on the plurality of work cards from the work order, including the steps of, (m) updating non-routine work cards; and (n) if the work card is suspended, then suspending work cards dependent upon the suspended work card;

means for updating the display to remove completed and suspended work cards;

means for performing what-if scenarios of the production schedule by revising the production parameters for the plurality of work cards from the work order, including the steps of, (o) selecting a production parameter to revise;

(p) selecting a time slot in the production schedule;

(q) determining resources needed to meet revised production parameters;

(r) comparing resources needed to meet revised production parameters with available resources;

(s) repeating steps (p) through (r) for each time slot in the production schedule;

(t) repeating steps (o) through (s) for each production parameter to be considered;

(u) recording each what-if scenario in the database; and (v) determining an optimal production schedule by finding which what-if scenario provides maximum usage of the available resources; and means for scheduling the work order according to the optimal production schedule, including the steps of, (w) determining start date of the work order by calculating earliest start and completion dates and latest start and completion dates for each of the plurality of work cards from the work order; and (x) determining end date of the work order by calculating elapsed time for each of the plurality of work cards from the work order, including a critical path for a longest time through the plurality of work cards from the work order; and (y) displaying the production schedule.

4. The computer system of claim 3, further including means for providing a graphical user interface (GUI) to the production scheduling process for a user.

5. A computer program product usable with a programmable computer processor having a computer readable program code embodied therein, comprising:

computer readable program code which loads a plurality of work orders from a database, each work order containing a plurality of work cards to define a plurality of tasks associated with the work order;

computer readable program code which compares the plurality of work cards for each work order to a work card template, including the steps of, (a) extracting the plurality of work cards from a work order;

(b) comparing work card identification numbers from the plurality of work cards from the work order to work card identification numbers from a plurality of work cards from the work card template;

(c) matching a work card identification number from one of the plurality of work cards from the work order with a work card identification number from one of the plurality of work cards from the work card template, then copying production parameters for a job associated with the matching one of the plurality of work cards from the work card template to the matching one of the plurality of work cards from the work order, the production parameters including at least a work card number, description of the job, sequence of the job, temporal data related to the job, status of the job, priority of the job, milestones for the job, execution phase of the job, and man-hours needed to perform the job;

(d) for each matching work card, determining dependency to other work cards from the work order, the dependencies including at least start-to-start dependency, start-to-finish dependency, finish-to-start dependency, and finish-to-finish dependency;

(e) for each dependency found in step (d), linking the work cards found to be dependent;

(f) comparing zone location of a work piece associated with the job on the work card from the work order with zone location of a work piece associated with the job on the work card from the work card template and, if found to differ, changing zone location on the work card from the work order to match zone location on the work card from the work card template; and (g) comparing skill of worker needed for the job on the work card from the work order with skill of worker needed for the job on the work card from the work card template and, if found to differ, changing skill of worker on the work card from the work order to match skill of worker on the work card from the work card template;

computer readable program code which adds work cards found in the work card template but not found in the plurality of work cards from the work order to the plurality of work cards to the work order, including the steps of, (h) querying the database for non-routine work cards associated with the work order;

(i) computing time for each non-routine work card associated with the work order;

(j) inserting each non-routine work card into the plurality of work cards for the work order;

(k) optimizing scheduling of the work order with the non-routine work cards inserted into the plurality of work cards in terms of demand and availability of resources; and (l) setting a baseline schedule of the work order according to the optimized schedule from step (k);

computer readable program code which displays the work order with table format with each row representing one of the plurality of work cards from the work order, the display including a plurality of boxes for selecting a work order, importing a work order, updating work cards within the work order, displaying non-routine work cards, modifying work cards within the work order, suspending work cards within the work order, viewing unscheduled work cards with the work order, and switching the display to graphical format;

computer readable program code which performs the plurality of tasks on the plurality of work cards from the work order;

computer readable program code which updates the database upon completion of each of the plurality of tasks on the plurality of work cards from the work order, including the steps of, (m) updating non-routine work cards; and (n) if the work card is suspended, then suspending work cards dependent upon the suspended work card;

computer readable program code which updates the display to remove completed and suspended work cards;

computer readable program code which performs what-if scenarios of the production schedule by revising the production parameters for the plurality of work cards from the work order, including the steps of, (o) selecting a production parameter to revise;

(p) selecting a time slot in the production schedule;

(q) determining resources needed to meet revised production parameters;

(r) comparing resources needed to meet revised production parameters with available resources; (s) repeating steps (p) through (r) for each time slot in the production schedule;

(t) repeating steps (o) through (s) for each production parameter to be considered;

(u) recording each what-if scenario in the database; an (v) determining an optimal production schedule by finding which what-if scenario provides maximum usage of the available resources; and computer readable program code which schedules the work order according to the optimal production schedule, including the steps of, (w) determining start date of the work order by calculating earliest start and completion dates and latest start and completion dates for each of the plurality of work cards from the work order; and (x) determining end date of the work order by calculating elapsed time for each of the plurality of work cards from the work order, including a critical path for a longest time through the plurality of work cards from the work order; and (y) displaying the production schedule.

6. The computer program product of claim 5, further including the step of providing a graphical user interface (GUI) to the production scheduling process for a user.

* * * * *